US011209777B2

(12) United States Patent
Minakuchi et al.

(10) Patent No.: US 11,209,777 B2
(45) Date of Patent: Dec. 28, 2021

(54) ELECTRONIC TIMEPIECE AND METHOD OF REPORTING STATE OF ELECTRONIC TIMEPIECE

(71) Applicant: CASIO COMPUTER CO., LTD., Tokyo (JP)

(72) Inventors: Mototaka Minakuchi, Tokyo (JP); Chiharu Shiratori, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 45 days.

(21) Appl. No.: 16/688,704

(22) Filed: Nov. 19, 2019

(65) Prior Publication Data
US 2020/0192289 A1  Jun. 18, 2020

(30) Foreign Application Priority Data
Dec. 17, 2018  (JP) .............................. JP2018-235041

(51) Int. Cl.
*G04B 3/04* (2006.01)
*G06F 3/0362* (2013.01)
*G04G 17/08* (2006.01)
*G04G 21/02* (2010.01)

(52) U.S. Cl.
CPC .............. *G04B 3/041* (2013.01); *G04G 17/08* (2013.01); *G04G 21/02* (2013.01); *G06F 3/0362* (2013.01)

(58) Field of Classification Search
CPC ........ G04B 3/041; G04G 17/08; G04G 21/02; G04G 21/00; G06F 3/0362; G01P 13/02; G01P 13/04; G04C 3/007; G04C 3/146; G04C 3/002; G01D 5/252

USPC ......................................................... 368/190
See application file for complete search history.

(56) References Cited

U.S. PATENT DOCUMENTS

| 7,623,415 | B2* | 11/2009 | Raeber | B63C 11/32 |
| | | | | 368/10 |
| 10,222,760 | B2* | 3/2019 | Hasegawa | G04C 3/146 |
| 10,429,799 | B2* | 10/2019 | Hasegawa | G04B 19/23 |
| 2007/0183264 | A1 | 8/2007 | Raeber et al. | |
| 2016/0266553 | A1 | 9/2016 | Hasegawa | |

(Continued)

FOREIGN PATENT DOCUMENTS

CN  1926481 A   3/2007
CN  105974788 A  9/2016

(Continued)

OTHER PUBLICATIONS

Chinese Office Action dated Feb. 23, 2021 in a counterpart Chinese patent application No. 201911299544.1.

*Primary Examiner* — Edwin A. Leon
(74) *Attorney, Agent, or Firm* — Chen Yoshimura LLP

(57) ABSTRACT

An electronic timepiece includes: a main unit having a reporting unit that reports information to a user; a crown that can be pulled out from and pushed back into a main unit by the user; a sensor that detects a state of the electronic timepiece; and a processor, wherein the processor detects a state of the crown and the state detected by the sensor and switches between a plurality of modes in accordance with the state of the crown, and wherein upon detecting that the crown has been pulled out or pushed back in, the processor causes the electronic timepiece to operate in a state reporting mode in which the reporting unit reports the state detected by the sensor to the user.

11 Claims, 10 Drawing Sheets

(56) References Cited

U.S. PATENT DOCUMENTS

2017/0082981 A1  3/2017  Hasegawa
2020/0103830 A1* 4/2020  Kato ..................... G01P 13/02

FOREIGN PATENT DOCUMENTS

| JP | 2015-184186 A | 10/2015 |
| JP | 2017-58265 A  | 3/2017  |
| JP | 2018-109594 A | 7/2018  |

* cited by examiner

ELECTRONIC TIMEPIECE AND METHOD OF REPORTING STATE OF ELECTRONIC TIMEPIECE

TECHNICAL FIELD

The technical field relates to an electronic timepiece and a method of reporting the state of the electronic timepiece.

BACKGROUND ART

Electronic timepieces that use a crown are conventionally well-known. By pulling out and rotating the crown with the fingers, the time and calendar of the electronic timepiece can be adjusted. Japanese Patent Application Laid-Open Publication No. 2015-184186 discloses an electronic timepiece invention that makes it possible to improve usability when adjusting a display unit by rotating an operation unit.

Moreover, technological progress in recent years has resulted in electronic timepieces being equipped with an increasing number of features such as temperature sensors, humidity sensors, direction sensors, and atmospheric pressure sensors. Furthermore, not only the time in the current location but also the time in other world cities is now displayed on wristwatches.

However, in electronic timepieces which have few operation buttons for design or concept reasons and particularly in analog-style electronic timepieces, as the number of features increases, operations for conveying the state of the timepiece to the user tend to become increasingly complex.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an electronic timepiece, including: a main unit having a reporting unit that reports information to a user; a crown that can be pulled out from the main unit to one or more prescribed positions away from a default position of the crown and that can be pushed back form the pulled out prescribed position to another of the one or more prescribed positions or to the default position; a sensor that detects a state of the electronic timepiece; and a processor, wherein the processor detects a state of the crown and the state of the electronic timepiece detected by the sensor and switches between a plurality of modes in accordance with the state of the crown, the plurality of modes including a normal mode that includes reporting current time in the reporting unit to the user and a state reporting mode that includes reporting the state of the electronic timepiece detected by the sensor to the user in addition to the current time or in place of at least some of information representing the current time, wherein when the processor detects that the crown is at the default position, the processor causes the electronic timepiece to operate in the normal mode, and wherein when the processor detects that the crown has been pulled out or pushed back into the default position or one of said one or more prescribed position away from the default position, the processor causes a current mode that has been assumed prior to said detection to be switched to the state reporting mode so as to report the state of the electronic timepiece detected by the sensor to the user.

In another aspect, the present disclosure provides a method performed by the above-described processor in the above-described timepiece that includes the above-enumerated tasks of the processor.

It is to be understood that both the foregoing general description and the following detailed description are exemplary and explanatory, and are intended to provide further explanation of the invention as claimed.

DETAILED DESCRIPTION OF EMBODIMENTS

Next, embodiments will be described in detail with reference to figures.

Each of the embodiments described below assigns a prescribed function to the operation of pushing the crown of an electronic timepiece back in. This makes it possible to achieve a greater degree of multifunctionality on the electronic timepiece without increasing the number of operation buttons. Furthermore, this makes it possible to report the state of the timepiece without making the operations complicated for the user.

Figure 1:
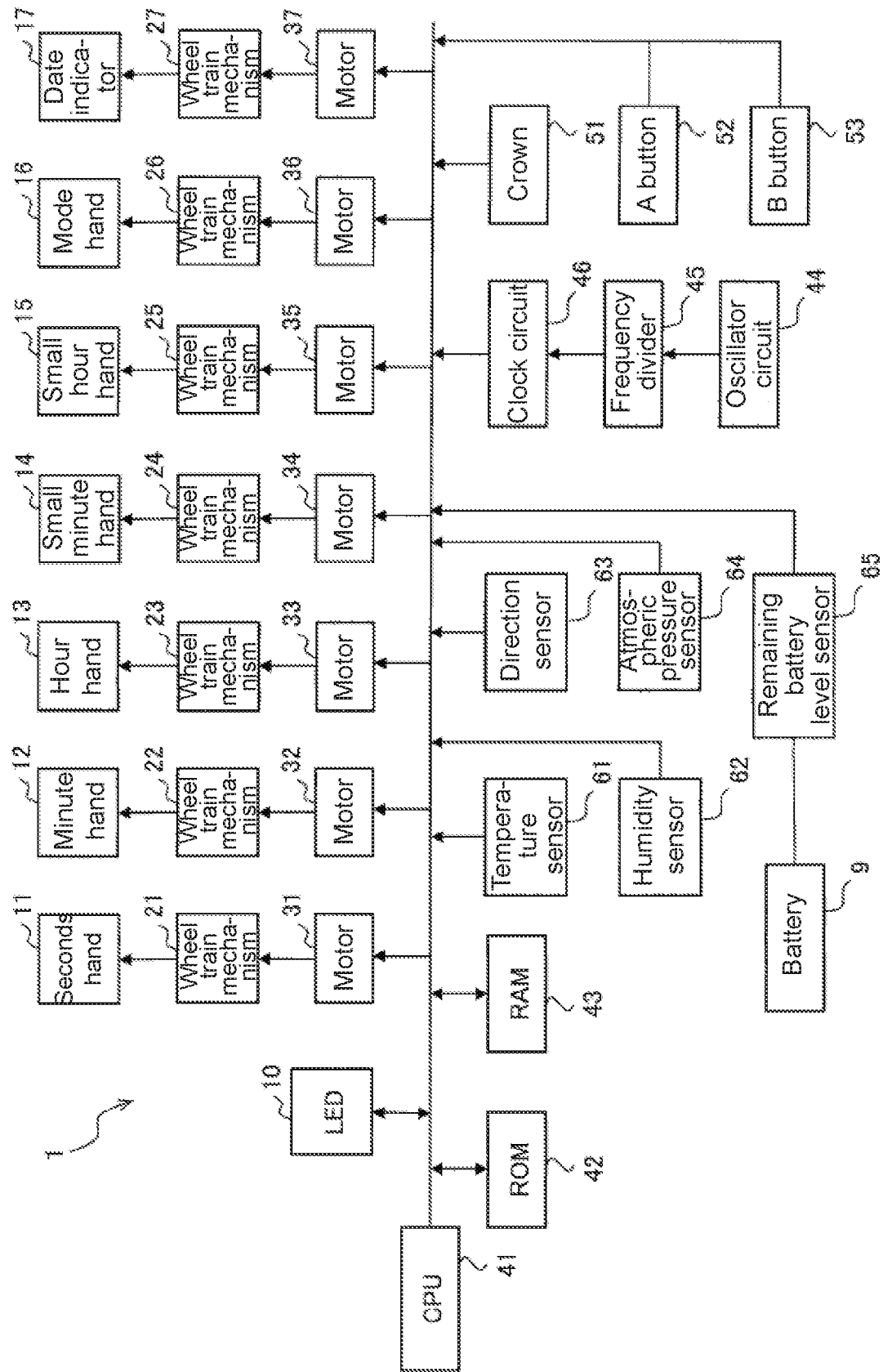
FIG. 1 is a block diagram schematically illustrating an electronic timepiece according to the present embodiment.

FIG. 1 is a block diagram schematically illustrating an electronic timepiece 1 according to the present embodiment.

The electronic timepiece 1 includes a central processing unit (CPU) 41, a read-only memory (ROM) 42, a random-access memory (RAM) 43, an oscillator circuit 44, a frequency divider 45, and a clock circuit 46. The electronic timepiece 1 further includes a crown 51, an A button 52, a B button 53, motors 31 to 37, wheel train mechanisms 21 to 27, a seconds hand 11, a minute hand 12, an hour hand 13, a small minute hand 14, a small hour hand 15, a mode hand 16, a date indicator 17, a light-emitting diode (LED) 10, a temperature sensor 61, a humidity sensor 62, a direction sensor 63, an atmospheric pressure sensor 64, and a remaining battery level sensor 65.

The ROM 42 is non-volatile memory and stores various types of data, programs (not illustrated in the figure) for controlling operations of the electronic timepiece 1 such as a time display feature, and the like. The RAM 43 is volatile memory, temporarily stores programs stored in the ROM 42, and stores temporary data needed to control operation of the electronic timepiece 1, for example.

The CPU 41 (a processor) executes programs loaded from the ROM 42 into the RAM 43 to control the operation of the electronic timepiece 1, provide the time display feature and other features, and switch between these features. The CPU 41 gets the state of the crown 51 and the state detected by the remaining battery level sensor 65 (a sensor) and functions as a control unit that switches between a plurality of modes on the basis of the state of the crown 51.

The oscillator circuit 44 uses a crystal oscillator, for example, to generate a signal of prescribed frequency and outputs this signal to the frequency divider 45 (described next). The frequency divider 45 divides the frequency signal and outputs the resulting signals to the clock circuit 46 and the CPU 41. The clock circuit 46 counts the signal input from the frequency divider 45 and adds this count to an initial value in order to keep the current time.

The crown 51 receives input operations from the user and outputs signals corresponding to these input operations to the CPU 41. Detection of the operations of the crown 51 being pulled out and pushed back in will be described later with reference to FIG. 3. When the crown 51 is in the pulled-out state, the CPU 41 detects rotation of the crown 51.

The A button 52 and the B button 53 receive input operations from the user and output signals corresponding to these input operations to the CPU 41. The crown 51, the A button 52, and the B button 53 are operation units via which the CPU 41 detects user operations.

The motors 31 to 37 rotate in accordance with instructions from the CPU 41.

The motor 31 rotates the seconds hand 11 via a wheel train mechanism 21, which is a series of a plurality of gears. The motor 32 rotates the minute hand 12 via the wheel train mechanism 22. The motor 33 rotates the hour hand 13 via the wheel train mechanism 23. The seconds hand 11, the minute hand 12, and the hour hand 13 are respectively rotated by the independent motors 31 to 33, thereby making it possible to quickly switch between display of world times and home time, for example.

The motor 34 rotates the small minute hand 14 via the wheel train mechanism 24. The motor 35 rotates the small hour hand 15 via the wheel train mechanism 25. The small minute hand 14 and the small hour hand 15 are respectively rotated by the independent motors 34 and 35, thereby making it possible to quickly switch between display of world times and home time, for example.

The motor 36 rotates the mode hand 16 via the wheel train mechanism 26. The motor 37 rotates the date indicator 17 via the wheel train mechanism 27.

The electronic timepiece 1 includes a battery 9 which supplies power. The remaining level of the battery 9 can be detected by the remaining battery level sensor 65.

The LED 10 is a light-emitting device which illuminates a dial 81 (see FIG. 2) of the electronic timepiece 1. The temperature sensor 61 is a sensor which detects temperature. The humidity sensor 62 is a sensor which detects humidity in the atmosphere. The direction sensor 63 is a sensor which detects direction by detecting magnetism. The atmospheric pressure sensor 64 is a sensor which detects atmospheric pressure. The remaining battery level sensor 65 is a sensor which detects the remaining level of the battery 9.

The electronic timepiece 1 also has a feature for detecting city information set to the timepiece and further includes a buzzer (not illustrated in the figures) which outputs notification sounds for an alarm feature and a timer feature.

Figure 2:
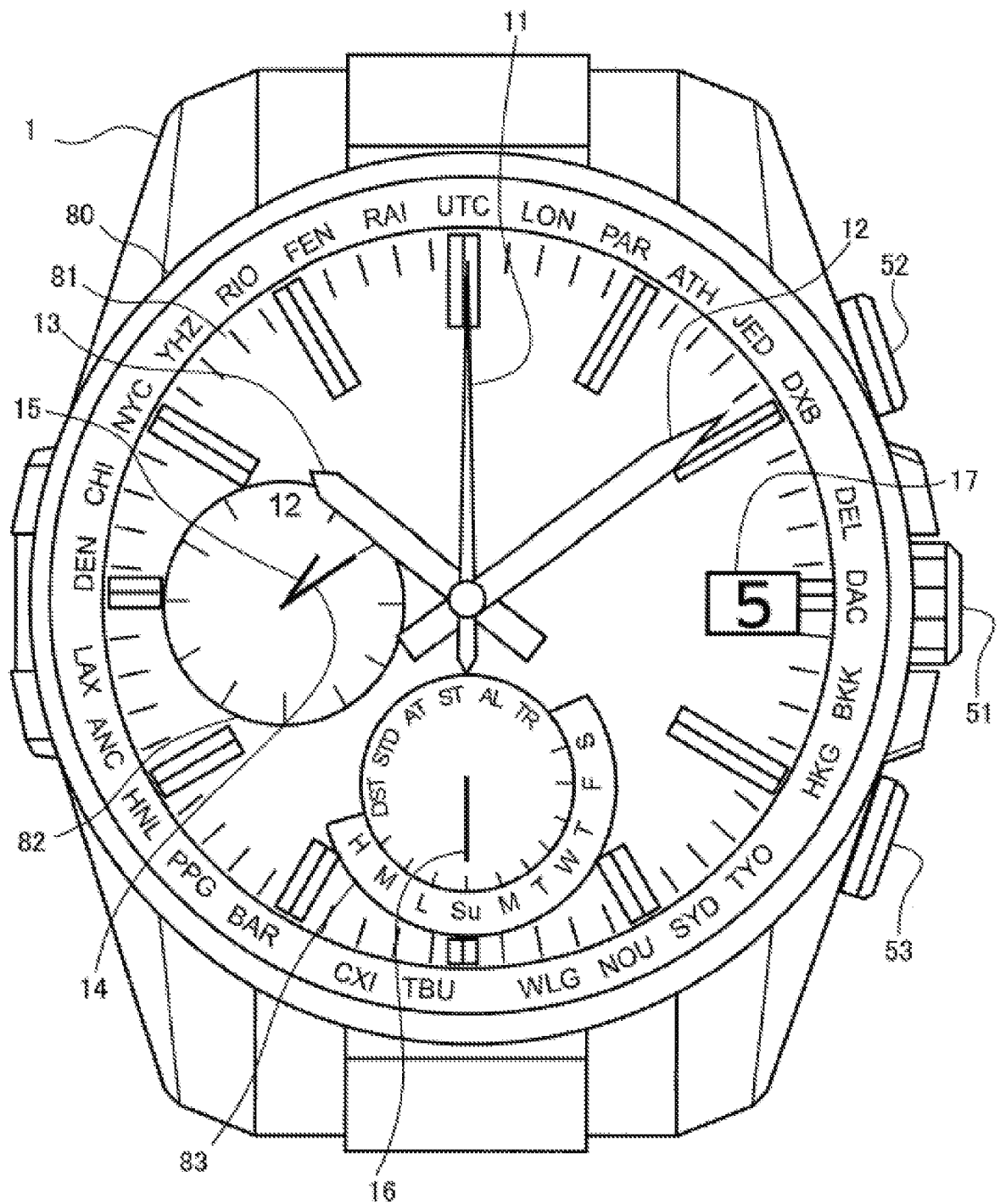
FIG. 2 is an exterior view illustrating a normal mode of the electronic timepiece.

FIG. 2 is an exterior view illustrating a normal mode of the electronic timepiece 1.

The electronic timepiece 1 is a watch to be worn on the arm of the user; has a time display feature, a world time city selection feature, a home time city selection feature, and the like; and includes a casing 80 which is a main unit and the dial 81 which forms a reporting unit. Here, a mode used as the time display feature in which the electronic timepiece 1 displays the current time will be referred to as the "normal mode". A mode in which the crown 51 of the electronic timepiece 1 is pulled out one click and which operates as a feature for selecting a world time city will be referred to as a "WT city selection mode". A mode in which the crown 51 of the electronic timepiece 1 is pulled out two clicks and which operates as a feature for selecting a home time city will be referred to as an "HT city selection mode".

The seconds hand 11, the minute hand 12, and the hour hand 13 are arranged on the dial 81 and report information. Moreover, a small window 82 which includes the small minute hand 14 and the small hour hand 15 is arranged on the center left side of the dial 81. Furthermore, a feature window 83 which includes the mode hand 16 is arranged on the center bottom side of the dial 81. The seconds hand 11, the minute hand 12, the hour hand 13, the small minute hand 14, the small hour hand 15, and the mode hand 16 are reporting units which report information.

An opening is formed in the center right side of the dial 81. The date indicator 17, on which dates of 1 to 31 are written, is rotatably arranged parallel to the dial 81 on the side opposite to the exposed surface of the dial 81, and the current date is indicated by one date being exposed from the opening. This date indicator 17 is a reporting unit which reports information.

The crown 51, the A button 52, and the B button 53 are arranged on the right side face of the casing 80. The crown 51 can be pulled out from and pushed back into the casing 80 (main unit). The user can configure desired settings on the electronic timepiece 1 by rotating the crown 51 when pulled out. The A button 52 and the B button 53 are operation units via which the CPU 41 detects user operations.

The seconds hand 11, the minute hand 12, and the hour hand 13 have a rotary shaft at the center of the dial 81 and display the time of the home time city by pointing to tick marks around the periphery of the dial 81. The small minute hand 14 and the small hour hand 15 have a rotary shaft at the center of the small window 82 and display the time of a world time city that has been set (also referred to as "world time"). Here, the cities that can be set are written around the periphery of the dial 81. For example, at approximately the 22-minute direction of the periphery of the dial 81, "TYO" is written, indicating Tokyo. Moreover, at approximately the 43-minute direction of the periphery of the dial 81, "LAX" is written, indicating Los Angeles.

The user can set Los Angeles as the world time city by pulling the crown 51 out one click and rotating the crown 51 to set the seconds hand 11 to "LAX".

The user can set Tokyo as the home time city by pulling the crown 51 out two clicks and rotating the crown 51 to set the seconds hand 11 to "Tokyo".

The mode hand 16 has a rotary shaft at the center of the feature window 83 and displays the day of the week or a feature corresponding to the current state of the electronic timepiece 1 by pointing thereto. In the time display feature (the time display feature mode), the "Su", "M", "T", "W", "T", "F", and "S" marks from the six o'clock to two o'clock directions on the feature window 83 represent the days of the week from Sunday to Saturday. In FIG. 2, the mode hand 16 indicates that the current day is Sunday.

In a stopwatch state, an alarm state, and a timer state, the mode hand 16 respectively points to "ST", "AL", and "TR".

In a remaining battery level display state, the mode hand 16 points to "H", "M", or "L", which indicate that the remaining battery level is high, medium, or low.

When daylight saving time is set or when in a state in which daylight saving time setting details are displayed, the mode hand 16 points to "DST", "STD", or "AT", which respectively indicate always being in daylight saving time, always being in standard time, and automatically switching therebetween. Here, "DST" is an abbreviation for "Daylight Saving Time". "STD" is an abbreviation for "Standard Time". "AT" is an abbreviation for "Automatic".

Figure 3:
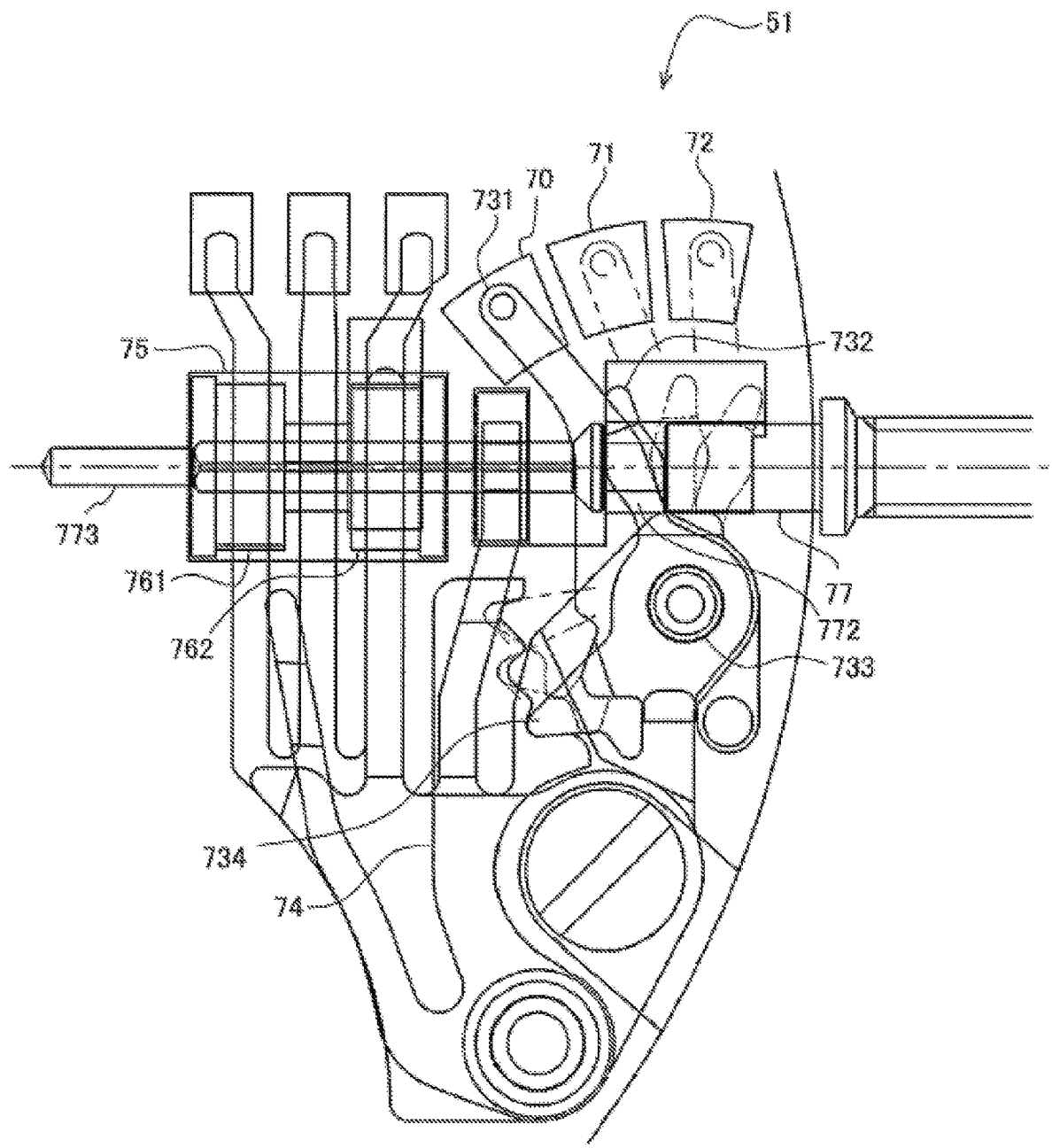
FIG. 3 illustrates the internal structure of a crown within a casing.

FIG. 3 illustrates the structure of the crown 51 within the casing 80.

Mechanisms for detecting the crown 51 being pulled out and pushed back in, the crown 51 being rotated, and the number of clicks which the crown 51 has been pulled out will be described with reference to FIG. 3.

A winding stem 77 has a circular rod shape, and the crown 51 is formed at one end thereof (the right side of the winding stem 77 in FIG. 3). The winding stem 77 can be moved in the axial direction thereof (by pulling out and pushing back in the crown 51) and can also be rotated about that axis and includes a stepped recess 772 and a shaft 773. Magnets 761 and 762 are arranged on the shaft 773 and rotate together with the shaft 773. When the crown 51 is pulled out one click or two clicks, the CPU 41 detects rotation of the crown 51 and the magnets 761 and 762 via a magnetic sensor 75. The magnets 761 and 762 and the magnetic sensor 75 are detection units for detecting rotation of the crown.

A coupling arm 732 and a contact spring 731 are arranged so as to be rotatable as a single unit about a fulcrum 733. The coupling arm 732 is arranged within the stepped recess 772. In accordance with the crown 51 being pulled out and pushed back in, the stepped recess 772 moves in the axial direction, while the coupling arm 732 rotates in accordance with the movement of the stepped recess 772 and the contact spring 731 moves and makes contact with one of the contact points 70, 71, and 72. Moreover, as the coupling arm 732 rotates, a claw 734 on the coupling arm 732 moves between recesses in a holding plate 74.

When the crown 51 is in a not pulled out state, the claw 734 fits into a lowermost recess in the holding plate 74. The contact spring 731 contacts the contact point 70. This contact point 70 is a dummy which is not connected to any other location, and therefore no current flows between the contact spring 731 and the contact point 70. Due to the contact spring 731 not contacting the contact points 71 and 72, the CPU 41 detects that the crown 51 is in the not pulled out state. In other words, when the crown 51 is in the not pulled out state, no current for detecting the state of the crown 51 flows.

When the crown 51 is pulled out one click, the winding stem 77 is pulled out, which causes the stepped recess 772 to move to the right and the coupling arm 732 to rotate to the right (clockwise). As a result, the claw 734 disengages from the lowermost recess in the holding plate 74 and mates with a recess second from the bottom, and the contact spring 731 moves from the contact point 70 to contacting the contact point 71. This causes current for detecting the state of the crown 51 to flow between the contact spring 731 and the contact point 71, and the CPU 41 detects that the crown 51 has been pulled out one click.

In this state, the CPU 41 detects rotation of the crown 51.

When the crown 51 is pulled out another click to two clicks, the claw 734 disengages from the second recess from the bottom in the holding plate 74 and mates with an (uppermost) recess third from the bottom, and the contact spring 731 moves from the contact point 71 to contacting the contact point 72. As a result, after contacting both the contact point 71 and the contact point 72, the contact spring 731 contacts only the contact point 72. This causes current for detecting the state of the crown 51 to flow between the contact spring 731 and the contact point 72, and the CPU 41 detects that the crown 51 has been pulled out two clicks.

In this state, the CPU 41 detects rotation of the crown 51.

When the crown 51 is then pushed in one click to one click, the contact spring 731 moves from the contact point 72 to contacting the contact point 71. As a result, after contacting both the contact point 71 and the contact point 72, the contact spring 731 contacts only the contact point 71. This causes current for detecting the state of the crown 51 to flow between the contact spring 731 and the contact point 71, and the CPU 41 detects that the crown 51 is pulled out to the one-click state.

When the crown 51 is pushed in another click to the not pulled out state, the contact spring 731 moves from the contact point 71 to contacting the contact point 70. Due to the contact spring 731 not contacting the contact points 71 and 72, the CPU 41 detects that the crown 51 is in the not pulled out state.

Figure 4:
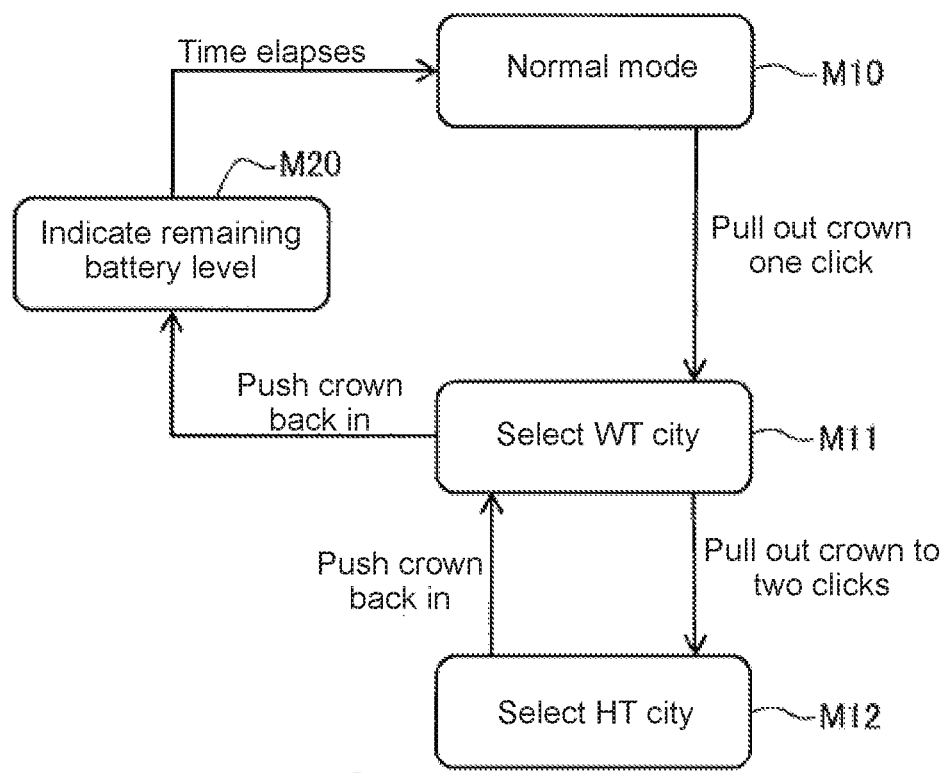
FIG. 4 is a mode transition diagram for Embodiment 1.

FIG. 4 is a mode transition diagram for Embodiment 1.

The normal mode (M10) is a mode used as the time display feature in which the electronic timepiece 1 displays the current time. In this normal mode, when the crown 51 is pulled out one click, the electronic timepiece 1 transitions to a world time city selection mode (M11). The world time city selection mode (M11) is a mode in which the world time city is selected by rotating the crown 51. Note that "world time" is abbreviated as "WY" in the figure.

In this world time city selection mode (M11), when the crown 51 is pulled out another click to two clicks, the electronic timepiece 1 transitions to a home time city selection mode (M12). The home time city selection mode (M12) is a mode in which the home time city is selected by rotating the crown 51. Note that "home time" is abbreviated as "HT" in the figure.

In the world time city selection mode (M11), when the crown 51 is pushed back in, the electronic timepiece 1 transitions to a remaining battery level indication mode (M20). In this remaining battery level indication mode, once a prescribed period of time has elapsed, the electronic timepiece 1 transitions to the normal mode (M10).

In the home time city selection mode (M12), when the crown 51 is pushed back in one click, the electronic timepiece 1 transitions to the world time city selection mode.

Figure 5:
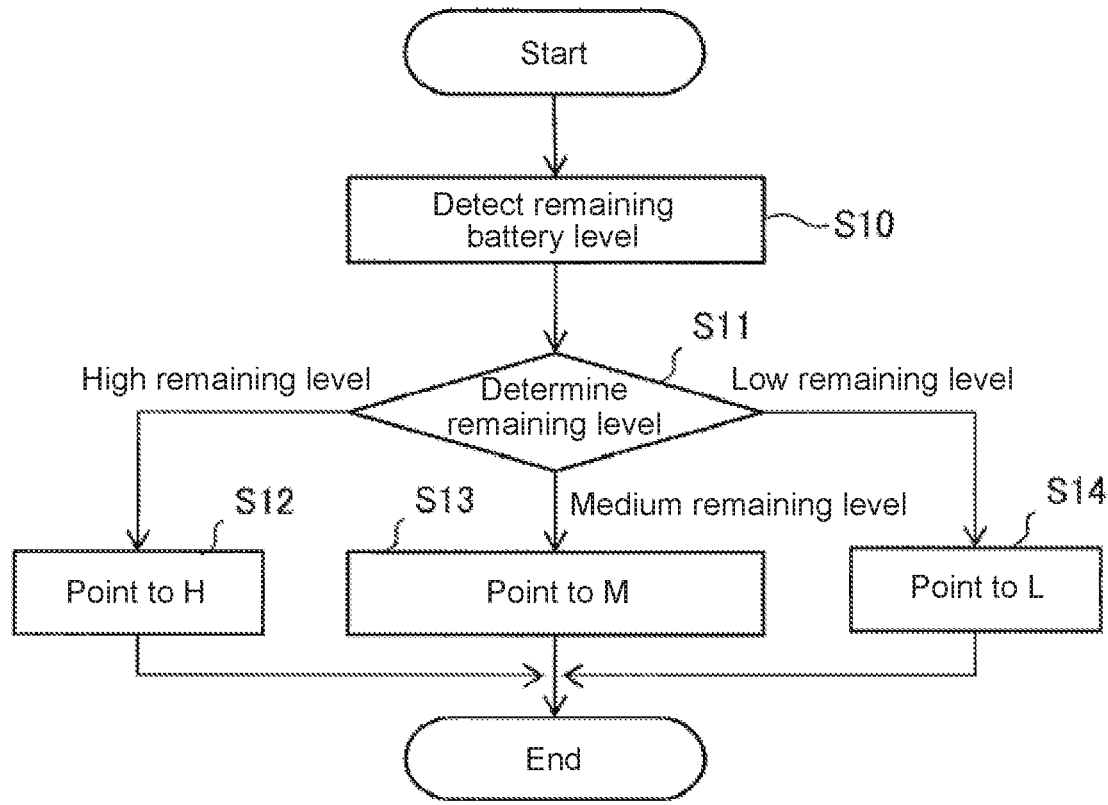
FIG. 5 is a flowchart of indicating a remaining battery level.

FIG. 5 is a flowchart of indicating the remaining battery level.

In the remaining battery level indication mode (M20 in FIG. 4), the CPU 41 uses the remaining battery level sensor 65 to detect the remaining level of the battery 9 (S10) and then determines the detected remaining level of the battery 9 (S11).

Upon determining in step S11 that the remaining level of the battery 9 is high, the CPU 41 instructs the mode hand 16 in the feature window 83 to point to "H" (S12) and then ends the process of FIG. 5.

Upon determining in step S11 that the remaining level of the battery 9 is medium, the CPU 41 instructs the mode hand 16 in the feature window 83 to point to "M" (S13) and then ends the process of FIG. 5.

Upon determining in step S11 that the remaining level of the battery 9 is low, the CPU 41 instructs the mode hand 16 in the feature window 83 to point to "L" (S14) and then ends the process of FIG. 5.

In this way, upon detecting that the crown 51 has been pushed back in, the CPU 41 makes the mode hand 16 in the feature window 83 report the remaining level of the battery 9 as detected by the remaining battery level sensor 65 while simultaneously switching from the world time city selection mode (M11) to the normal mode (M10).

Figure 6:
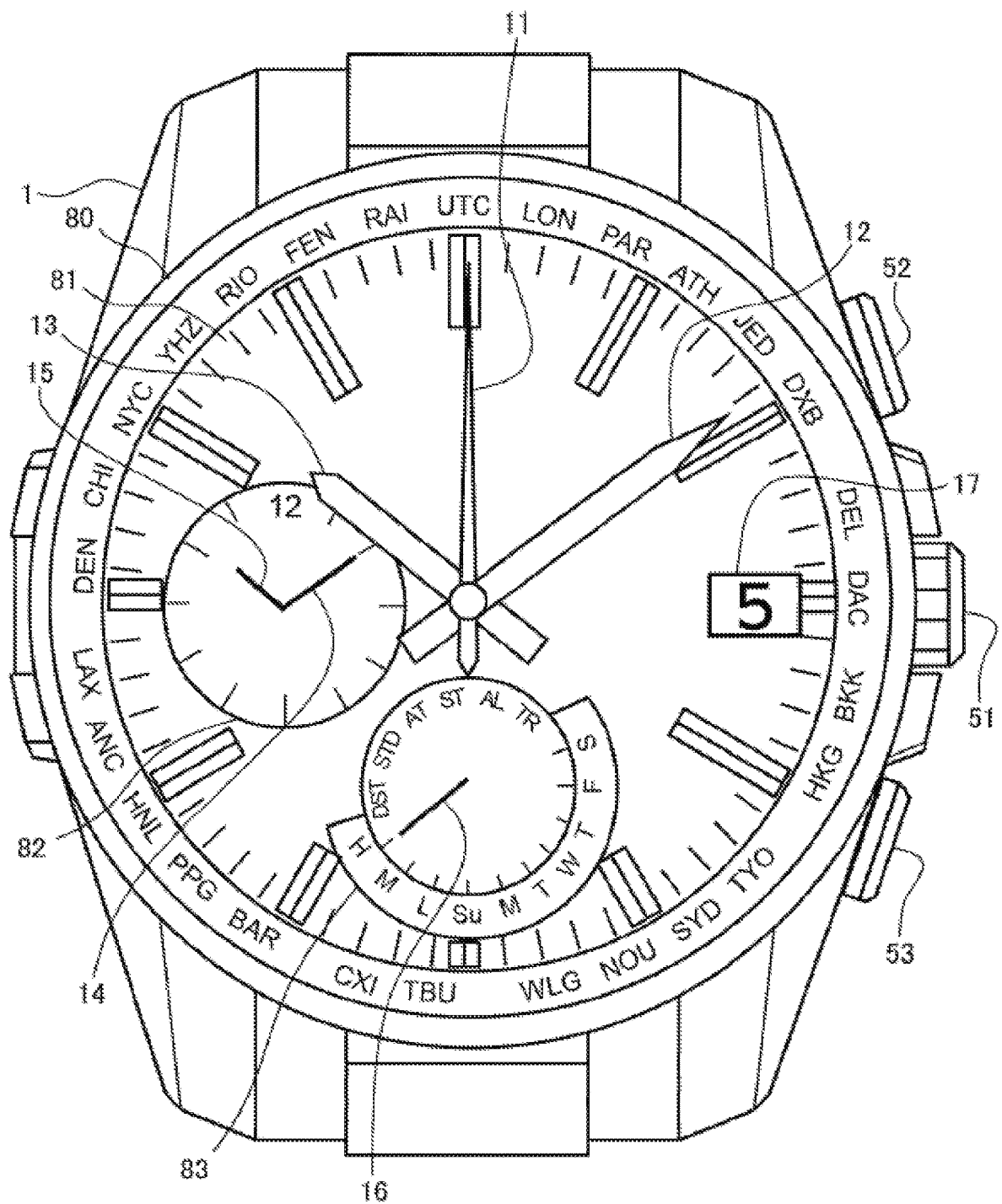
FIG. 6 is an exterior view illustrating a mode in which the electronic timepiece indicates the remaining battery level.

FIG. 6 is an exterior view in which the electronic timepiece 1 is in the remaining battery level indication mode.

In this mode M20 for indicating the remaining level of the battery 9, the mode hand 16 of the electronic timepiece 1 is pointing to "H". Thus, here the electronic timepiece 1 is indicating that the current remaining level of the battery 9 is high.

The electronic timepiece 1 displays the remaining level of the battery 9 when the crown 51 is pushed back in, thereby achieving a feature for displaying the remaining level of the battery 9 without increasing the number of operation buttons.

The electronic timepiece 1 could also alternatively implement a feature for displaying the remaining level of the battery 9 without increasing the number of operation buttons through use of complicated mode transitions. However, such complicated mode transitions could potentially reduce usability of the electronic timepiece 1.

In the present embodiment, the remaining level of the battery 9 is displayed for a prescribed period of time when the crown 51 is pushed back in. This achieves the feature for displaying the remaining level of the battery 9 without making the mode transitions complicated.

Figure 7:
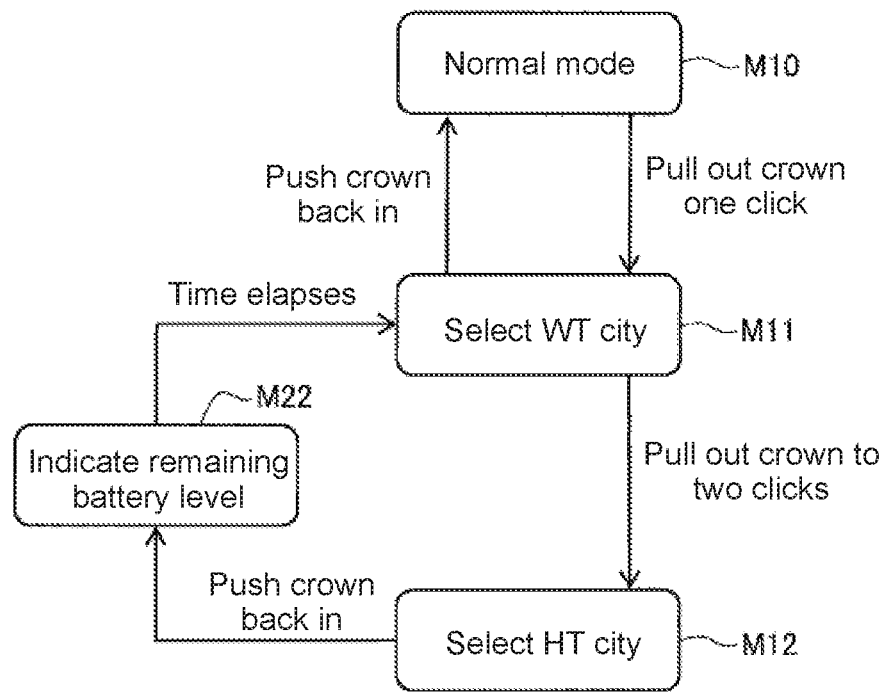
FIG. 7 is a mode transition diagram for Embodiment 2.

FIG. 7 is a mode transition diagram for Embodiment 2.

In Embodiment 2, when the crown 51 is pushed back in one click when in the home time city selection mode (M12), the electronic timepiece 1 transitions to the mode for indicating the remaining level of the battery 9 (M22). In the mode for indicating the remaining level of the battery 9 (M22), once a prescribed period of time has elapsed, the electronic timepiece 1 transitions to the world time city selection mode (M11). In this way, the electronic timepiece 1 may display the remaining level of the battery 9 when the crown 51 is pushed back in from two clicks to one click.

Figure 8:
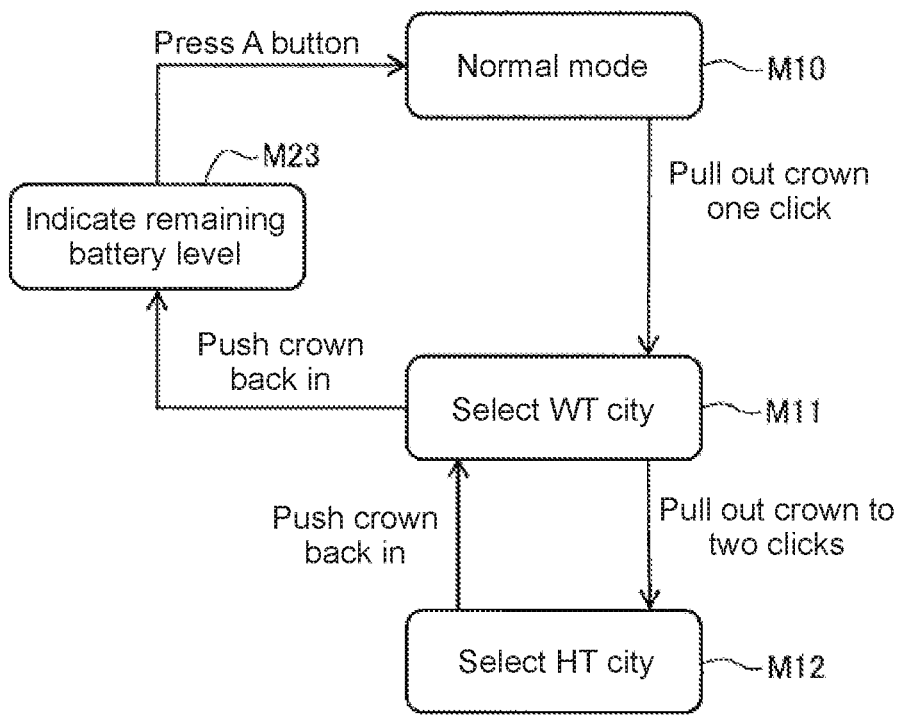
FIG. 8 is a mode transition diagram for Embodiment 3.

FIG. 8 is a mode transition diagram for Embodiment 3.

The electronic timepiece 1 of Embodiment 3 transitions to a mode for indicating the remaining level of the battery 9 (M23) similarly to with the mode for indicating the remaining level of the battery 9 in mode M20 of Embodiment 1.

Then, in the mode for indicating the remaining level of the battery 9 (M23), when the A button 52 (an operation element) is pressed, the electronic timepiece 1 transitions to the normal mode (M10) for displaying the current time. The other mode transitions are the same as the mode transitions described in Embodiment 1 (FIG. 4). In this way, the electronic timepiece 1 may be configured to transition to the normal mode (M10) upon receiving a prescribed operation rather than after a prescribed period of time has elapsed.

Moreover, the trigger for transitioning from the mode for indicating the remaining level of the battery 9 (M23) to the normal mode (M10) is not limited to being the A button 52 and may be the B button 53 or another operation unit and is not particularly limited.

In Embodiments 1 to 3, a feature for displaying the remaining level of the battery 9 is assigned to the timing of the crown 51 being pushed back in. However, the information displayed is not limited to being the remaining battery level of the timepiece and may be temperature, humidity, direction, atmospheric pressure, or the like or may be home time city information. Embodiments 4 to 9 below relate to these features being assigned.

Figure 9:
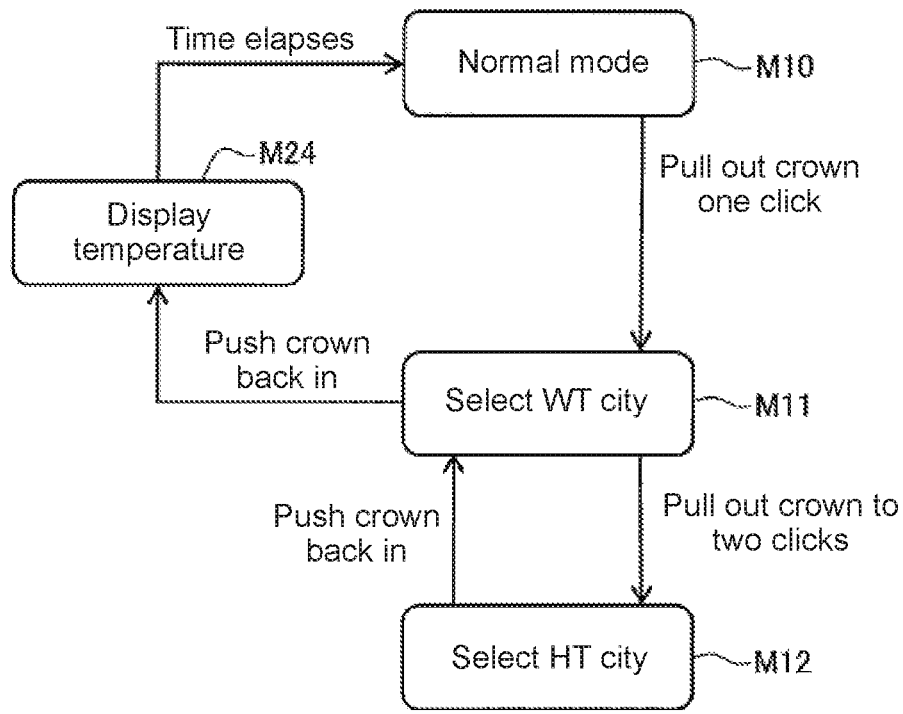
FIG. 9 is a mode transition diagram for Embodiment 4.

FIG. 9 is a mode transition diagram for Embodiment 4.

The electronic timepiece 1 of Embodiment 4 transitions to a temperature indication mode (M24) rather than indicating the remaining level of the battery 9 as in the mode M20 in Embodiment 1. At this time, the CPU 41 gets the current temperature from the temperature sensor 61 and can make the seconds hand 11 point to a number of seconds corresponding to the current temperature, for example.

Then, in the temperature indication mode (M24), once a prescribed period of time has elapsed the electronic timepiece 1 transitions to the normal mode (M10) for displaying the current time. The other mode transitions are the same as the mode transitions described in Embodiment 1 (FIG. 4).

Figure 10:
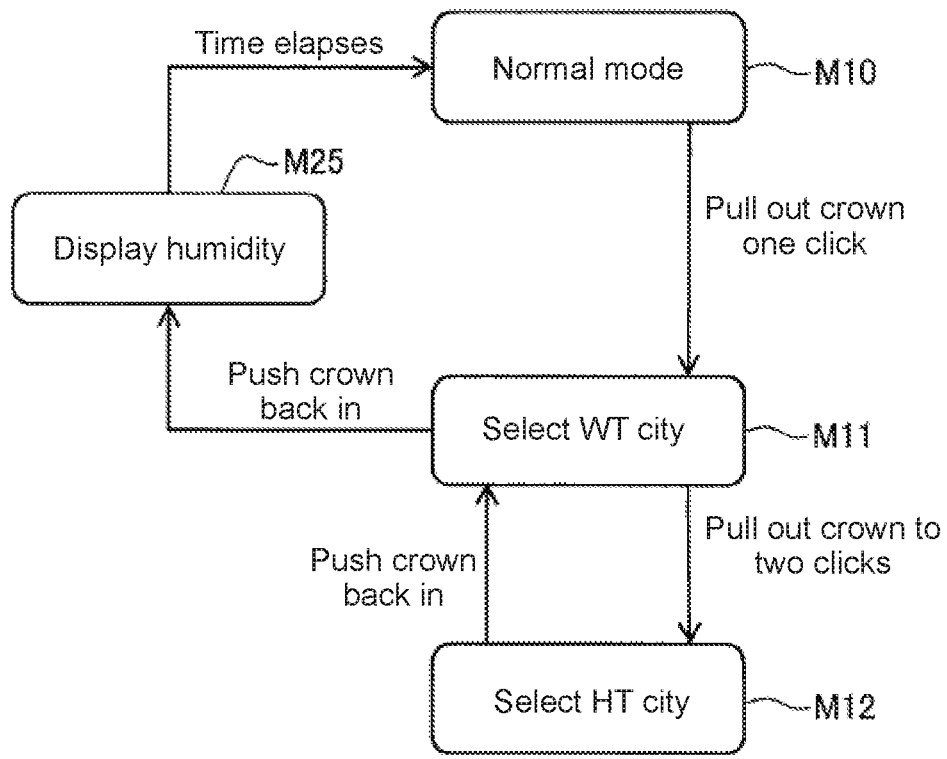
FIG. 10 is a mode transition diagram for Embodiment 5.

FIG. 10 is a mode transition diagram for Embodiment 5.

The electronic timepiece 1 of Embodiment 5 transitions to a humidity indication mode (M25) rather than indicating the remaining level of the battery 9 as in the mode M20 in Embodiment 1. At this time, the CPU 41 gets the current humidity from the humidity sensor 62 and can make the mode hand 16 point to a mark corresponding to the current humidity, for example.

Then, in the humidity indication mode (M25), once a prescribed period of time has elapsed the electronic timepiece 1 transitions to the normal mode (M10) for displaying the current time. The other mode transitions are the same as the mode transitions described in Embodiment 1 (FIG. 4).

Figure 11:
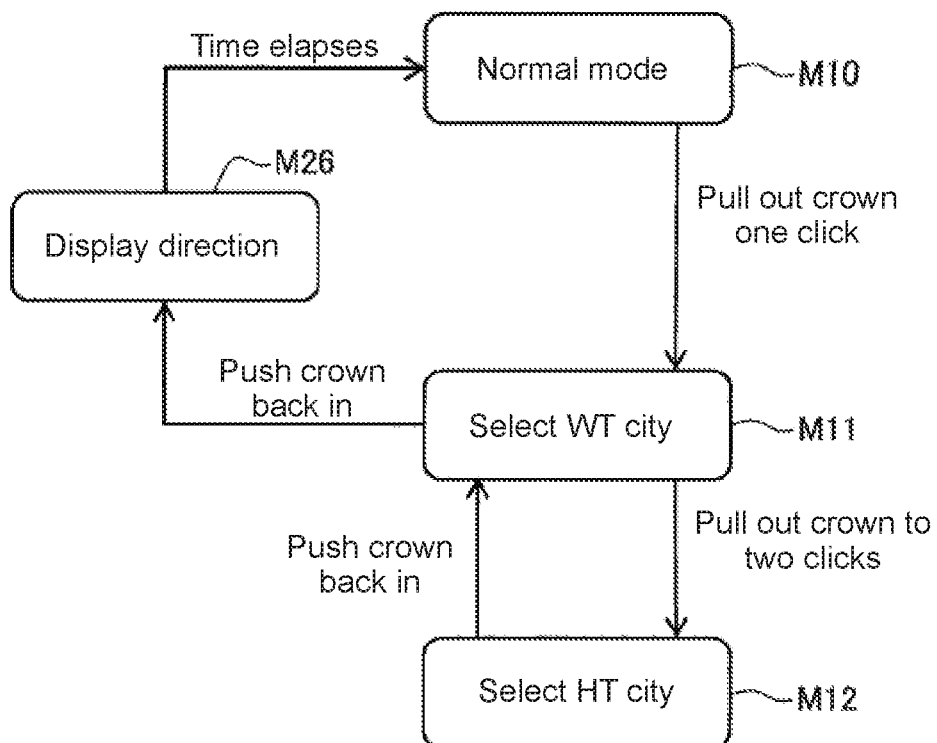
FIG. 11 is a mode transition diagram for Embodiment 6.

FIG. 11 is a mode transition diagram for Embodiment 6.

The electronic timepiece 1 of Embodiment 6 transitions to a direction (magnetic north pole) indication mode (M26) rather than indicating the remaining level of the battery 9 as in the mode M20 in Embodiment 1. At this time, the CPU 41 gets the magnetic north pole (the current direction) from the direction sensor 63 and can repeat an operation of making the seconds hand 11 point to the current north magnetic pole, for example. In this way, even if the electronic timepiece 1 is rotated, the electronic timepiece 1 can make the seconds hand 11 point to the direction of the magnetic north pole.

Then, in the direction indication mode (M26), once a prescribed period of time has elapsed the electronic timepiece 1 transitions to the normal mode (M10) for displaying the current time. The other mode transitions are the same as the mode transitions described in Embodiment 1 (FIG. 4).

Figure 12:
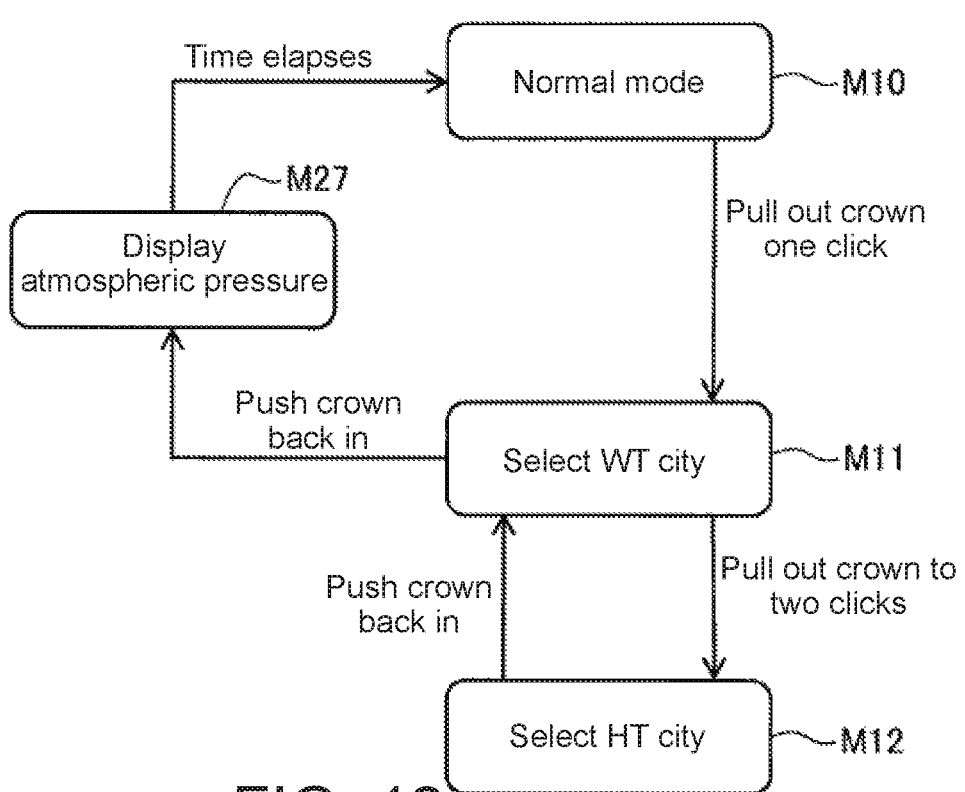
FIG. 12 is a mode transition diagram for Embodiment 7.

FIG. 12 is a mode transition diagram for Embodiment 7.

The electronic timepiece 1 of Embodiment 7 transitions to an atmospheric pressure indication mode (M27) rather than indicating the remaining level of the battery 9 as in the mode M20 in Embodiment 1. At this time, the CPU 41 gets the current atmospheric pressure from the atmospheric pressure sensor 64 and can make the seconds hand 11 point to the current atmospheric pressure, for example.

Then, in the atmospheric pressure indication mode (M27), once a prescribed period of time has elapsed the electronic timepiece 1 transitions to the normal mode (M10) for displaying the current time. The other mode transitions are the same as the mode transitions described in Embodiment 1 (FIG. 4).

Figure 13:
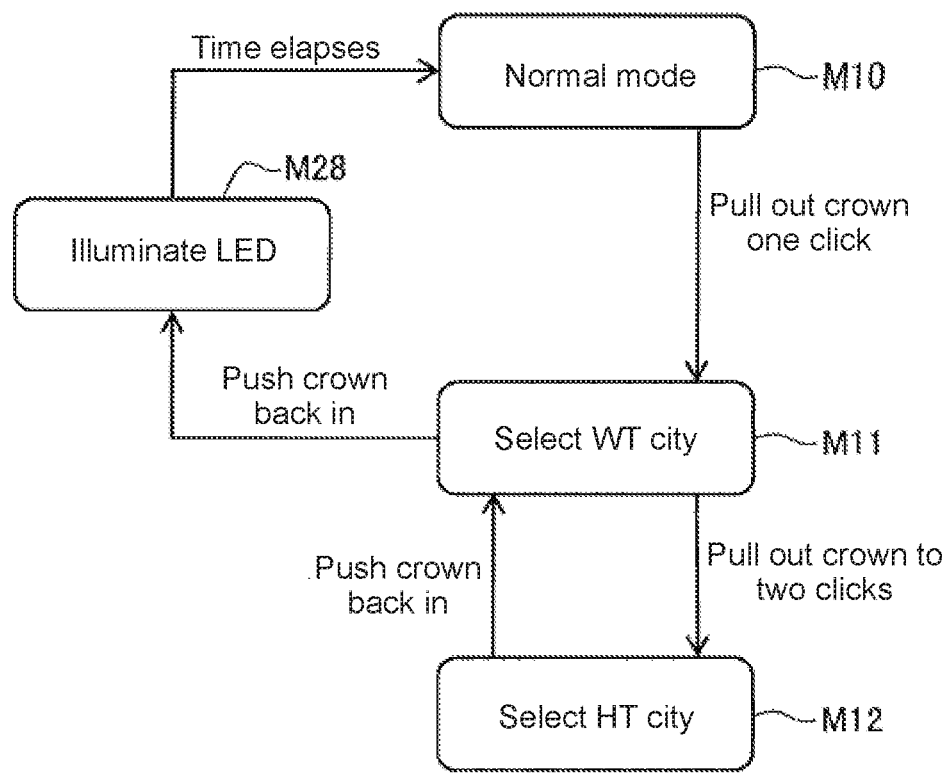
FIG. 13 is a mode transition diagram for Embodiment 8.

FIG. 13 is a mode transition diagram for Embodiment 8.

The electronic timepiece 1 of Embodiment 8 transitions to an LED 10 illumination mode (M28) rather than indicating the remaining level of the battery 9 as in the mode M20 in Embodiment 1. At this time, the CPU 41 illuminates the LED 10.

Then, in the LED 10 illumination mode (M28), once a prescribed period of time has elapsed the electronic timepiece 1 transitions to the normal mode (M10) for displaying the current time. The other mode transitions are the same as the mode transitions described in Embodiment 1 (FIG. 4).

The process of illuminating the LED 10 in this mode M28 is not a report of the state of the electronic timepiece 1 and simply involves executing a prescribed process (feature).

Figure 14:
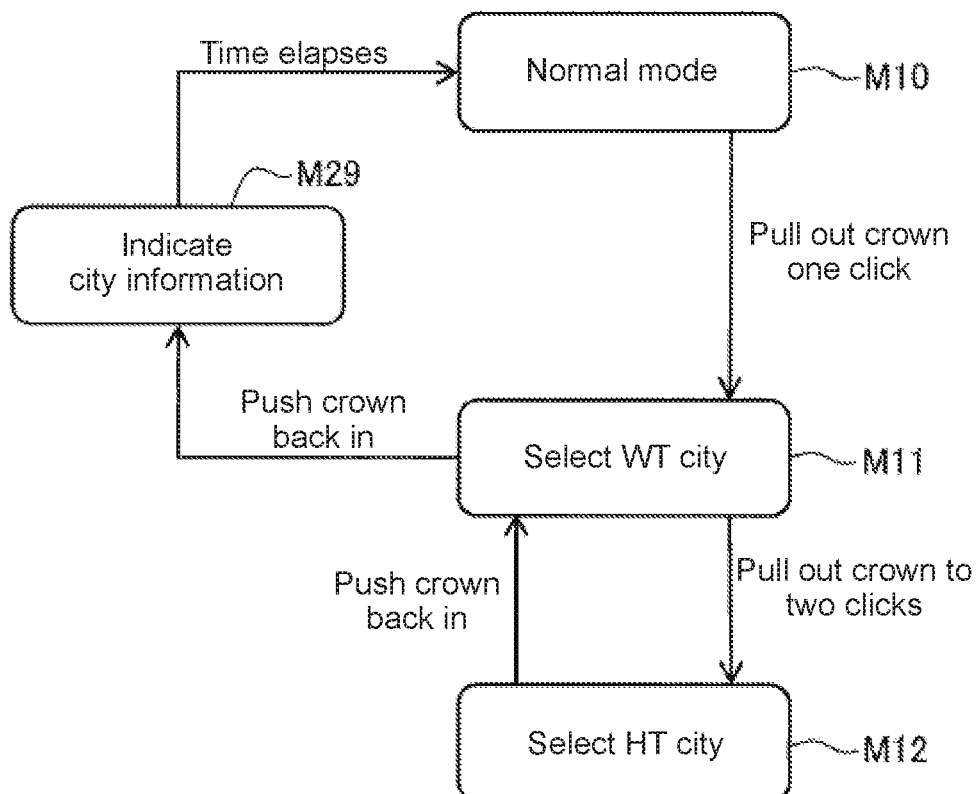
FIG. 14 is a mode transition diagram for Embodiment 9.

FIG. 14 is a mode transition diagram for Embodiment 9.

The electronic timepiece 1 of Embodiment 9 transitions to a home time city information indication mode (M29) rather than indicating the remaining level of the battery 9 as in the mode M20 in Embodiment 1. At this time, the electronic timepiece 1 can make the seconds hand 11 point to the current home time city information, for example. The home time city information is stored in the RAM 43 in FIG. 1 or the like. The CPU 41 functions as a sensor which reads and detects the home time city information from the RAM 43.

Then, in the current home time city information indication mode (M29), once a prescribed period of time has elapsed the electronic timepiece 1 transitions to the normal mode (M10) for displaying the current time. The other mode transitions are the same as the mode transitions described in Embodiment 1 (FIG. 4).

In each of Embodiments 1 to 9, a feature is assigned to the timing of the crown 51 being pushed back in. However, the present invention is not limited to these examples, and features may be assigned to the timing of the crown 51 being pulled out. This will be described as Embodiment 10.

Figure 15:
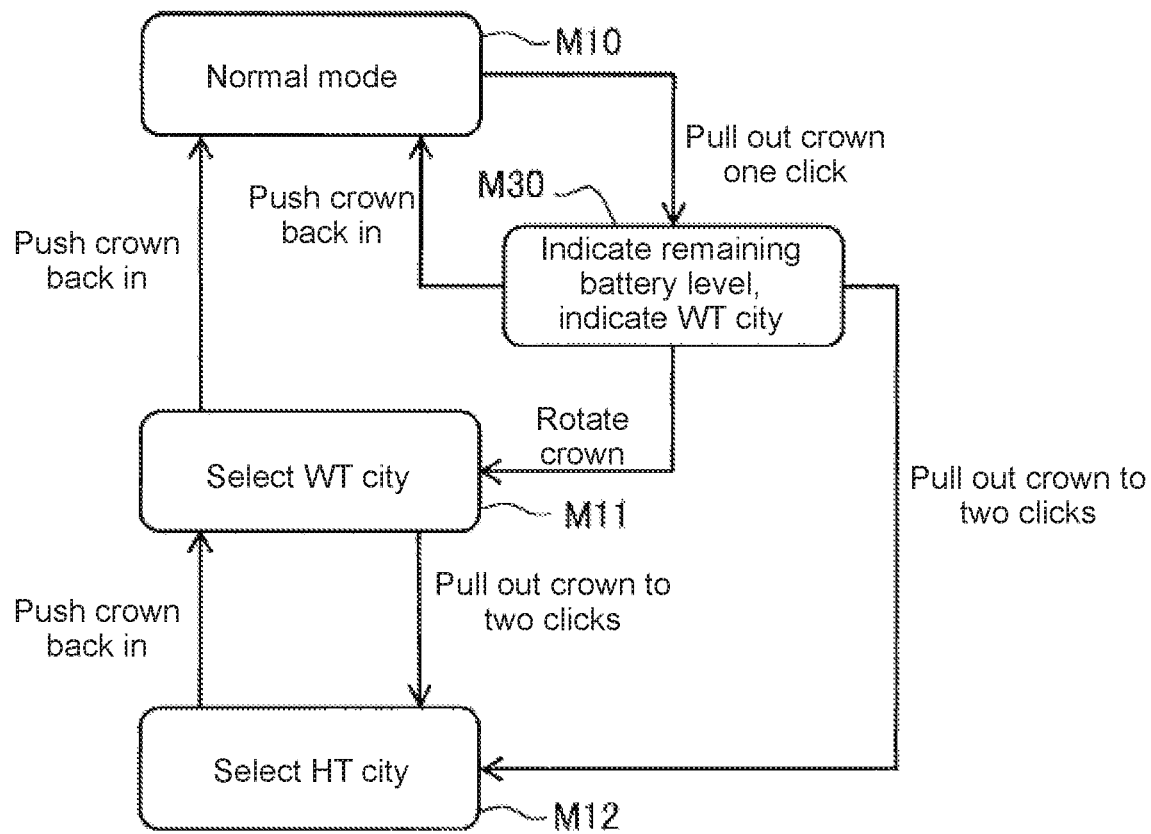
FIG. 15 is a mode transition diagram for Embodiment 10.

FIG. 15 is a mode transition diagram for Embodiment 10.

The normal mode (M10) is a mode used as a time display feature in which the electronic timepiece 1 displays the current time. In this normal mode, when the crown 51 is pulled out one click, the electronic timepiece 1 transitions to a mode for respectively indicating the remaining battery level and the world time city (M30). In this mode M30, the electronic timepiece 1 uses the mode hand 16 to indicate the remaining battery level and uses the seconds hand 11 to indicate the world time city.

In this remaining battery level and world time city indication mode (M30), upon detecting rotation of the crown 51, the electronic timepiece 1 stops indicating the remaining battery level with the mode hand 16 and transitions to a world time city selection mode (M11). Furthermore, in the remaining battery level and world time city indication mode (M30), when the crown 51 is pushed back in, the electronic timepiece 1 transitions to the normal mode (M10). In the mode M30, when the crown 51 is pulled out another click to two clicks, the electronic timepiece 1 transitions to a home time city selection mode (M12).

Here, the user can end indication of the remaining battery level by rotating, pushing back in, or pulling out the crown 51, thereby making it possible to check the remaining battery level without any time constraints.

The world time city selection mode (M11) is a mode in which the world time city is selected by rotating the crown 51. At this time, the mode hand 16 points to the current day of the week.

In the world time city selection mode (M11), when the crown 51 is pulled out another click to two clicks, the electronic timepiece 1 transitions to the home time city selection mode (M12). The home time city selection mode (M12) is a mode in which the home time city is selected by rotating the crown 51.

In the world time city selection mode (M11), when the crown 51 is pushed back in, the electronic timepiece 1 transitions to the normal mode (M10).

In the home time city selection mode (M12), when the crown 51 is pushed back in one click, the electronic timepiece 1 transitions to the world time city selection mode (M11).

Modification Examples

The present invention is not limited to the embodiments described above, and various modifications can be made without departing from the spirit of the present invention. For example, modifications such as (a) to (i) below are possible.

(a) The components that display information when the crown is pushed back in are not limited to being the mode hand 16 and the seconds hand 11 and may be other hands or may be display devices other than hands such as digital displays including the LED 10, liquid crystal screens, or the like.

(b) The features assigned to the timing of the crown being pushed back in are not limited to being information display features. Information may be reported using audio or vibrations and is not particularly limited.

(c) The features assigned to the timing of the crown being pushed back in may be effect features for explicitly indicating that the crown has been pushed back in, such as making the seconds hand oscillate, for example.

(d) The features assigned to the timing of the crown being pushed back in are not limited to being information display features and may be processing features such as a process of receiving the time via radio waves or a process of synchronizing with a smartphone and are not particularly limited.

(e) Features are not limited to being assigned to the timing of the crown being pushed back in from the one-click state, and features may be assigned to the timing of the crown being pushed back in from the two-click state to the one-click state and are not particularly limited.

(f) Features are not limited to being assigned the timing of the crown being pushed back in. As described in Embodiment 10, a prescribed feature may be assigned to the timing of the crown being pulled out one click, and a prescribed feature may be assigned to the timing of the crown being pulled out again to two clicks. Moreover, it is useful for the feature (mode) assigned to the timing of the crown being pulled out one click or two clicks to be cleared when the crown is rotated. This makes it possible to report state regardless of how much time has elapsed.

(g) The number of clicks to which the crown can be pulled out is not limited to two clicks and may be one click or may be three or more clicks.

(h) Features may be assigned to the timing of the crown being pulled out multiple clicks within a prescribed period of time or to the timing of the crown being pushed back in multiple clicks within a prescribed period of time.

(i) The information reported by the electronic timepiece 1 when the crown is pulled out or pushed back in is not limited to being states of the electronic timepiece 1 itself and may be user states such as heart beats per minute, blood pressure, or total number of steps walked that day, for example.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. An electronic timepiece, comprising:
a main unit having a reporting unit that reports information to a user;
a crown that can be pulled out from the main unit to one or more prescribed positions away from a default position of the crown and that can be pushed back form the pulled out prescribed position to another of the one or more prescribed positions or to the default position;
a plurality of sensors that respectively detect various states of the electronic timepiece; and
a processor configured to:
detect a state of the crown,
switch between a plurality of modes in accordance with the state of the crown, the plurality of modes including (i) a normal mode that includes reporting current time in the reporting unit to the user and (ii) a plurality of state reporting modes respectively reporting the states of the electronic timepiece detected by the respective sensors to the user in addition to the current time or in place of at least some of information representing the current time,
in response to an event that the processor detects that the crown is at the default position, cause the electronic timepiece to operate in the normal mode, and
in response to an event that the processor detects that the crown has been pulled out or pushed back into the default position or one of said one or more prescribed position away from the default position, cause a current mode that has been assumed prior to said detection to be switched to one of the plurality of state reporting modes so as to report the corresponding state of the electronic timepiece detected by the corresponding sensor to the user.

2. The electronic timepiece according to claim 1, wherein the processor causes the one of the plurality of state reporting modes to terminate and be switched to another mode automatically once a prescribed period of time has elapsed so that said reporting of the state of the electronic timepiece is terminated automatically.

3. The electronic timepiece according to claim 1, further comprising an operation element operable by the user,
wherein the processor causes the one of the plurality of state reporting modes to terminate and be switched to another mode upon detecting a user operation of the operation element.

4. The electronic timepiece according to claim 1, wherein the processor causes the one of the plurality of state reporting modes to terminate and be switched to another mode upon detecting rotation of the crown.

5. The electronic timepiece according to claim 1, wherein the reporting unit includes a pointer driven by a motor.

6. The electronic timepiece according to claim 1, wherein the reporting unit is a light-emitting device.

7. The electronic timepiece according to claim 1, wherein the reporting unit is a display unit that displays the state detected by the sensor.

8. The electronic timepiece according to claim 1, wherein the states detected by the plurality of sensors include remaining battery level, temperature, humidity, direction, and atmospheric pressure.

9. The electronic timepiece according to claim 1, wherein the states detected by the plurality of sensors include city information set to the electronic timepiece, and the one of the plurality of state reporting modes reports the city information set to the electronic timepiece.

10. A method performed by a processor in an electronic time piece that includes, in addition to the processor, a main unit having a reporting unit that reports information to a user; a crown that can be pulled out from the main unit to one or more prescribed positions away from a default position of the crown and that can be pushed back form the pulled out prescribed position to another of the one or more prescribed positions or to the default position; and a plurality of sensors that respectively detect various states of the electronic timepiece, the method comprising, via the processor:
detecting a state of the crown;
switching between a plurality of modes in accordance with the state of the crown, the plurality of modes including (i) a normal mode that includes reporting current time in the reporting unit to the user and (ii) a plurality of state reporting modes respectively reporting the states of the electronic timepiece detected by the respective sensors to the user in addition to the current time or in place of at least some of information representing the current time;
in response to an event of detecting that the crown is at the default position, causing the electronic timepiece to operate in the normal mode; and
in response to an event of detecting that the crown has been pulled out or pushed back into the default position or one of said one or more prescribed position away from the default position, causing a current mode that has been assumed prior to said detection to be switched to one of the plurality of state reporting modes so as to report the corresponding state of the electronic timepiece detected by the corresponding sensor to the user.

11. The electronic timepiece according to the claim 1,
wherein the crown is movable in a plurality of positions step by step along a pull-push direction, and
wherein the processor causes said current mode that has been assumed prior to said detection to be switched to said one of the plurality of state reporting modes based on a detected one of the plurality of positions of the crown so as to report the corresponding state of the electronic timepiece.

* * * * *